Patented Aug. 7, 1928.

1,680,109

UNITED STATES PATENT OFFICE.

IWAN OSTROMISLENSKY, OF NEW YORK, N. Y., ASSIGNOR TO THE PYRIDIUM CORPORATION, OF NEW YORK, N. Y., A CORPORATION OF NEW YORK.

METHOD OF OBTAINING PYRIDIUM.

No Drawing.   Application filed March 26, 1926. Serial No. 97,771.

This invention is an improvement in methods of obtaining azo-dyes of the pyridine series, and with respect to its more specific features to the obtaining of a group, which for convenience, is designated as pyridium.

One of the primary objects of the invention is the provision of a substance adapted for use as a medical compound in the treatment of certain diseases of bacterial origin.

In the investigations of the reactions between diazotized aromatic amines and alpha-alpha-diamino-pyridine, a series of azo-dyes were isolated, each containing the pyridine nucleus in its molecule, a series which in many respects displays properties that one could not foresee in theory.

The reaction, that is, the coupling of diazotized aromatic amines, and alpha-alpha-diamino-pyridine, results in the formation of a mixture of two isomers of phenyl-azo-diamino-pyridine, with a certain amount of diphenyl-diazo-diamino-pyridine, the compounds having the formulas given below, in which the phenyl-azo isomers are designated I and II, respectively, and the diphenyl compound III:—

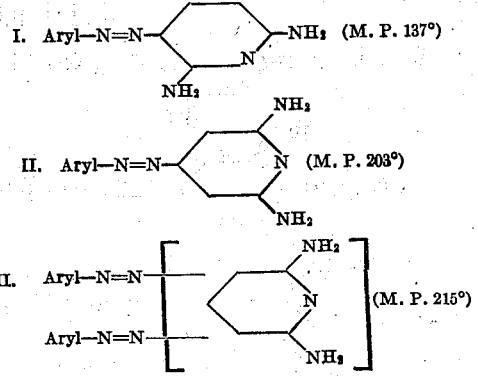

The relative proportion of the several compounds depends upon the specific details of the reaction. For instance, a very valuable absorbent substance of diphenyl-diazo-diamino-pyridine hydrochloride, with a certain amount of isomeric phenyl-azo-diamino-pyridine hydrochlorides, may be obtained by the coupling of one molecule of alpha-alpha-diamino-pyridine in acid solution with an acid solution of diazotized aniline to the amount of more than one-half and less than two molecules.

These compounds of the pyridine series were obtained by using aniline, para-toluidine, para-bromaniline, and the like, in the capacity of original aromatic amines. The groups form with the acids in most cases two series of salts, such as mono and dihydrochlorides.

In a free condition the new compounds take on various shades of brown or rather brownish shades, yellow brown, or even yellow, whereas the salts display in most cases, red, brick or dark red tints, often with a velvety bluish glitter.

I have discovered that the mixture of the above mentioned compound, although but slightly toxic is strongly bactericidal, for which reason it is of value as a medical preparation in a variety of infectious diseases.

In this connection it may be stated that the diphenyl of the mixture (III) may be isolated from the monophenyl isomers, since the hydrochlorides of the mono-phenyl isomers are much more soluble in water than the diphenyl.

Up to the present, all of the azo-dyes of this series which I have succeeded in separating in a chemically pure condition as well as their salts, display typical colloidal or semi-colloidal properties, notwithstanding their crystalline form.

Example I.

As one exemplification of the method of obtaining the compounds, a solution of 93 gms. of freshly distilled aniline in 8500 c. c. of 1% hydrochloric acid is cooled with ice to plus 6° C. diazotization is conducted under the usual conditions by means of a solution of 69 gms. of sodium nitrite in 4 litres of water. Into the resulting solution of diazotized aniline, another solution of 54.5 gms. of alpha-alpha-diamino-pyridine in 500 c. c. of 10% hydrochloric acid is then added.

The resultant mixture is allowed to stand for from two to five hours at room temperature, then the excess of the hydrochloric acid is neutralized by treating with a saturated aqueous solution of sodium acetate. The neutralization is continued until a weak but clear acid reaction on congo paper is obtained. The solution is now allowed to stand overnight and then filtered under pressure. The resulting sediment of hydrochloride is pressed, washed in hot water in small quantities, repressed and redried. The product may then be recrystallized out of boiling water in relatively large quantity.

The product, principally a mixture of the compounds having the formulas I and II, is a micro-crystalline fine powder, bright red in color. It displays semi-colloidal properties, dissolves with difficulty in hot water, and is soluble in cold water only in small amounts. It dissolves readily in boiling aniline and pyridine.

When aqueous ammonia is added to the solution, the corresponding free base which is almost insoluble in water, immediately precipitates even at normal temperature. It seems most probable that the compound consists of a mixture of the isomers I and II with some III. The diphenyl compound is slightly soluble in concentrated hydrochloric and sulphuric acids, and in trichlor acetic acid, with a deep violet or green color, and slightly soluble with violet color in concentrated nitric acid.

When the compound II is heated in a capillary tube the substance changes color at approximately 130° C., becoming gradually darker, and at last melting within a wide range of 195 to 210° C. The substance that has again been purified by recrystallization from boiling water melts at approximately 203° C., and appears to be probably the compound II as above indicated. The hydrochloride of this compound dissolves readily in an aqueous solution of para-amino-phenyl-azo-benzol hydrochloride, or in a solution of hydrochlorides of azo dyes of the benzol or pyridine series.

The last mentioned substance may be made more soluble in water in the manner set forth in the following examples (a) and (b):—

(a) 100 gms. hydrochloride of phenyl-azo-(gamma) - alpha-alpha - diamino - pyridine, melting point 203° C., and 150 gms. of para-amino-phenyl-azobenzol hydrochloride are dissolved in boiling water and recrystallized therefrom.

(b) 100 gms. phenyl-azo-(gamma)-alpha-alpha-diamino-pyridine hydrochloride and 100 gms. of isomeric phenyl-azo-diamino-pyridine hydrochloride compound I in powder form are dissolved in boiling water and recrystallized therefrom.

The product from both processes (a) and (b) is homogeneous and stable, forming easily .3 to 1% aqueous solutions. 50 c. c. of a .5 solution of the product of process (b) requires, to insure complete disappearance of the red color 10 to 12 c. c. of N-10 solution of sodium hydroxide.

*Example II.*

As another exemplification, into a solution of 93 gms. of aniline, diazotized as described in Example I, (1 gm.-molecule) a solution of alpha-alpha-diamino-pyridine in 10% hydrochloric acid may be poured under the same conditions to any amount less than 109 gms. (1 gm.-molecule), and more than 54.5 gms. (½ gm.-molecule). The reaction product which is termed pyridium, may then be subjected to the further treatment and purification as described in detail in Example I.

This procedure results in the direct formation of a thoroughly homogeneous mixture or rather a very durable-absorbent compound of the hydrochlorides of the two isomeric phenyl-azo-diamino-pyridine and the diphenyl-diazo-diamino-pyridine. The product has stable properties, both chemical and biological. In ordinary precipitation it will not be decomposed into its component ingredients or parts. The composition can be brought about only by means of a very thorough fractional recrystallization of the product from, for instance, boiling water.

It should be understood that although I stated above that the product of Example I is principally a mixture of the compounds having the formulas (I) and (II) above stated, the product probably contains also traces of the formula (III). For, I have found by experiment that when the quantity of sodium acetate in Example I is increased, and when it is added to the azo solution immediately after coupling, the yield becomes principally of the compound (III), above stated. This compound, namely; diphenyl-diazo-alpha-alpha-diamino-pyridine can be recognized by the following properties. It is orange red powder of crystalline structure and has a melting point of 215° C. This substance has also the property of forming salts only with strong acids, and of being almost insoluble in hydrochloric acid. This property affords a method of separation of compounds (I), (II) and (III), which, as stated above, are almost invariably produced in mixture. Thus, when the mixture of substances produced by Example II, is treated with dilute hydrochloric acid, the substance (III) precipitates and can be isolated.

What is claimed as new is:

1. The method of obtaining a substance of the character described, which consists in the direct coupling of diazotized amines of the aromatic series with diaminopyridine salts in hydrochloric acid solution, to the amount of more than one half and less than two molecules of the diazotized amines.

2. The method of obtaining a substance of the character described by direct coupling of diazotized aniline with diaminopyridine with more than one half and less than two molecules of diazotized aniline to each molecule of diaminopridine.

3. The method of obtaining a substance of the character described by direct coupling of diazotized aniline with diaminopyridine with more than one half and less than two molecules of diazotized aniline to each molecule of diaminopyridine in acid solution.

4. The method of obtaining a substance of the character described soluble in water, which consists in the direct coupling of diazotized aniline and diaminopyridine, in the proportion of 93 gms. of the first, and more than 54.5 and less than 109 gms. of the second in a hydrochloric acid solution.

5. The method of obtaining a substance of the character described, which consists in the direct coupling of diazotized aniline and diaminopyridine, in the proportion of more than 46.5 and less than 186 gms. of the first, 109 gms. of the second, and purifying the product by recrystallizing from boiling water.

Signed at New York, in the county of New York and State of New York, this 24th day of March, A. D. 1926.

IWAN OSTROMISLENSKY.